H. ZOELLY AND A. GAGG.
SERVO-MOTOR CONTROLLING MECHANISM.
APPLICATION FILED MAR. 16, 1921.
1,423,786.
Patented July 25, 1922.
2 SHEETS—SHEET 1.
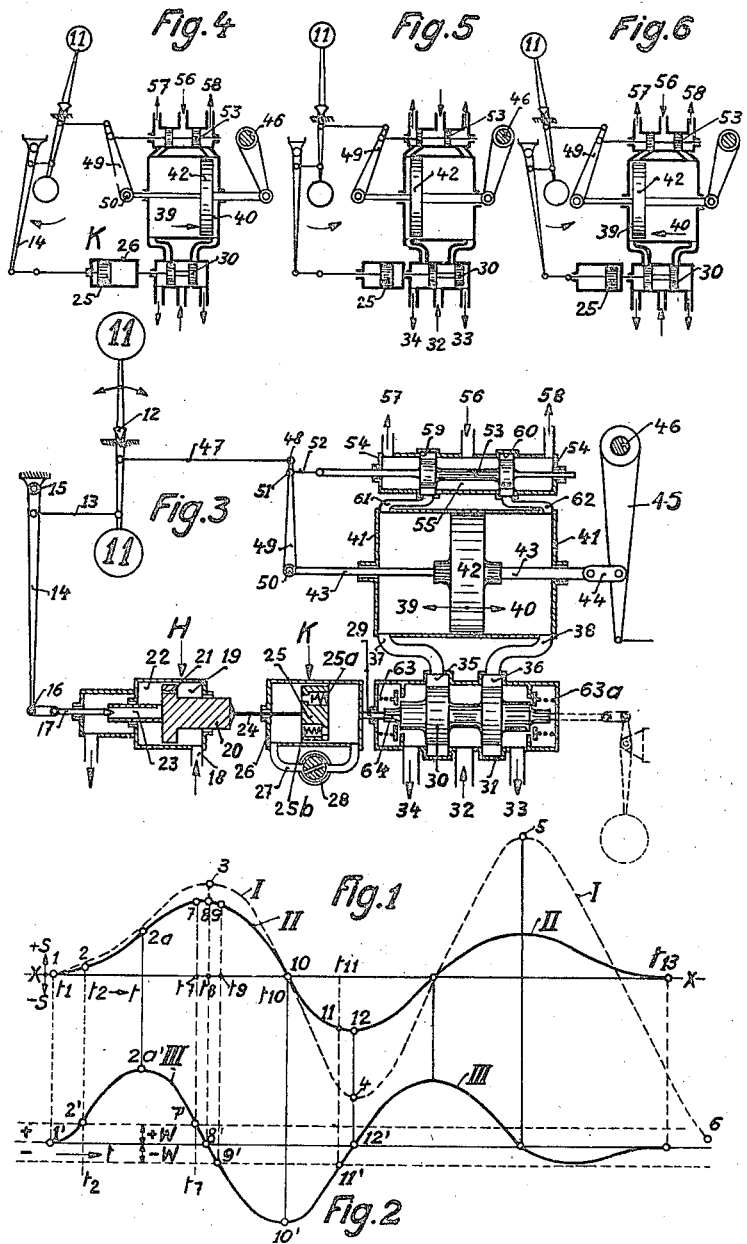

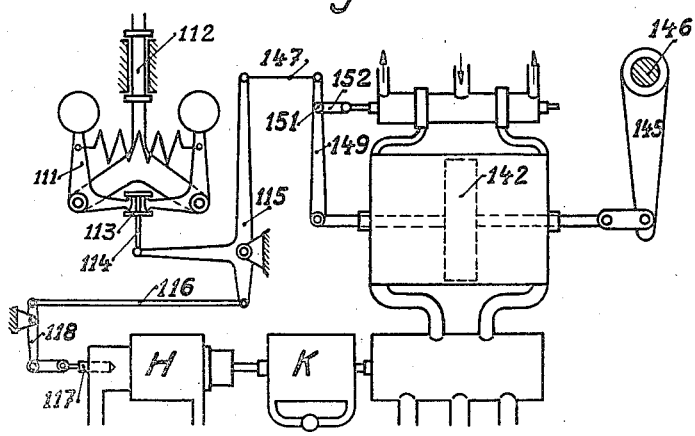
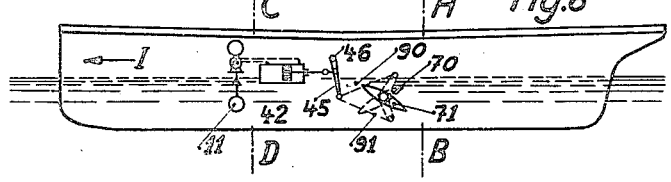
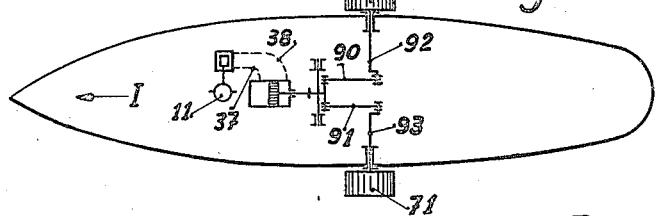
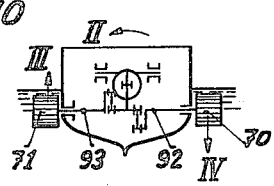
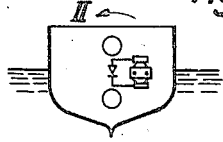

UNITED STATES PATENT OFFICE.

HEINRICH ZOELLY AND ANTON GAGG, OF ZURICH, SWITZERLAND.

SERVO-MOTOR-CONTROLLING MECHANISM.

1,423,786.     Specification of Letters Patent.     Patented July 25, 1922.

Application filed March 16, 1921. Serial No. 452,736.

*To all whom it may concern:*

Be it known that we, HEINRICH ZOELLY and ANTON GAGG, citizens of the Republic of Switzerland, both residing at Zurich, Switzerland, have invented certain new and useful Improvements in Servo-Motor-Controlling Mechanism; and we do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The present invention relates to improvements in a device for governing a servomotor adapted to regulate working or service conditions of a contrivance. According to the invention an auxiliary organ, the position of which is dependent on the working conditions to be regulated, causes a controlling member for the servomotor to be displaced out of its mid position as soon as the velocity with which the auxiliary organ alters its position in one or the other direction, exceeds a certain limit, the displacement of the controlling member in the corresponding direction being maintained as long as the excess of said speed continues, whereupon the controlling member is returned to its mid position by special means.

Thereby it is assumed that the regulation of the working conditions of the contrivance is effected by a regulating member operated by the servomotor; said member may hereinafter be called the main regulating member. In many cases the servomotor adapted to operate said main regulating member may be a servomotor of the known type which solely serves to influence by means of the main regulating member the working conditions of a power generating machine, without delivering itself any power for driving purposes.

In order to operate the member serving to control the servomotor a special auxiliary organ is required, for instance a pendulum, the position of which depends on the working or service conditions to be regulated. According to the invention the action of said auxiliary organ has only to last as long as the displacement of said organ is effected at a speed that exceeds a given limit. As long as this does not occur the same auxiliary means, for instance springs or weights, which cause the controlling member of the servomotor to return to its mid position, may at the same ensure the controlling member of the servomotor remaining in its mid position until a fresh change in the position of said auxiliary organ operating said controlling member occurs at a speed that exceeds the given limit.

In the accompanying drawings constructional examples of the invention are diagrammatically illustrated. In these drawings—

Figures 1, and 2 are diagrams showing relations between the alterations of the service conditions of a machine and the working conditions of the contrivance.

Fig. 3 shows the arrangement of the contrivance for damping the rolling movement of a ship;

Figs. 4–6 illustrate different operative positions of the parts of the contrivance according to Fig. 3;

Fig. 7 shows a regulating contrivance in connection with a governing arrangement of a power generating engine.

Figs. 8–11 illustrate constructional examples of a ship fitted with the regulating contrivance illustrated in Figure 3.

The essence of the above method will now be explained with reference to the accompanying drawings. On the diagram shown in Fig. 1 the abscissæ, measured from left to right, represent the time. The ordinates represent the working conditions of the contrivance. The curve I shown in dotted lines indicates how the alteration of the working conditions to be regulated would be if the regulating arrangement working according to the present method had not been employed. This curve may for instance indicate the rolling or oscillating movement of a ship caused by the waves. For the sake of clearness this example shall mainly be considered at first in the following description. The ordinates extending above and below the axis of the abscissæ $x$—$x$ indicates on a certain scale the amplitudes $+s$ and $-s$ of the oscillating movement of a point on deck of the ship from the position of rest in dependence upon the time $t$, or, when measured in another scale, the angle of inclination of the longitudinal plane through the middle of the ship against the vertical longitudinal plane through said middle. Fig.

2 illustrates the velocity curve III derived from the time-distance curve II of Fig. 1. The abscissæ represent the same time $t$ as in Fig. 1 and the ordinates the corresponding velocities of the oscillating movement of the ship.

At the time $t_1$ (curves in Figs. 1 and 2) the disturbance of the state of persistance or repose of the running ship begins and the latter starts to oscillate. The main regulating member or the blades (70 and 71 Figs. 8–10) arranged at the sides of the ship shall now be brought into the required position as soon as the velocity of the oscillating movement exceeds a certain admissible lower limit ($+w$ or $-w$ in Fig. 2). This, for instance may be the case at the time $t_2$, at which the deviation of the ship from the vertical started at the time $t_1$ increases with a certain speed 2′ (according to curve III, Fig. 2). If the ship were left to itself, the rolling or oscillating movement might in some cases produce constantly increasing amplitudes such as are represented by the curve I connecting the points 1—2—3—4—5— in Fig. 1. The regulating blades (70 and 71 in Figs. 8–10) shall now counteract this first oscillation or deviation of the ship out of its mid or vertical position in one direction until this deviation has reached the culminating point 8 of the curve II Fig. 1. When this point is passed and the ship oscillates back towards its mid position, the regulating blades have to be moved into the opposite position in which they counteract the new rolling movement of the ship in the other direction. This occurs, however, again only after that the velocity of the rolling movement exceeds the given minimum velocity ($-w$). This is the case at the time $t_9$, said velocity being represented by the point 9′ of curve III. Thereafter the ship returns to its mid position, point 10, and then tilts beyond said position towards the other side of the vertical plane to the point 12 (curve II). The regulating blades remain from the time $t_9$ up to the time $t_{12}$ in their new position, that is approximately during such a period until the ship changes again, in accordance with curve II of Fig. 1, the direction of its oscillating movement.

A governing device for carrying into effect the above described method would show the pecularity that the main regulating member (i. e. the lateral regulating blades 70 and 71 in Figs. 8–10 influencing the working conditions of a contrivance, i. e. of the ship in the present example, remains, after it has once been brought into its operative position, in that position until the contrivance (the ship) gives rise to a changing of the position of the main regulating member owing to a renewed change of its working conditions. Therefore in the described example of the ship, the regulating blades could never be returned to their horizontal position, i. e. their inoperative position or "position of rest" and the ship would not be able to resume its mid position and remain in that position even when the waves were decreasing.

The method according to the invention may now be carried into effect in such a way, that the auxiliary organ, for instance an inertia pendulum, which is dependent upon the working conditions to be regulated, operates a second controlling member of the servomotor so that a definite operative position of the servomotor and thereby of the member regulating the working conditions, i. e. of the above mentioned regulating blades, corresponds to every position of rest of the auxiliary organ. In the example of a ship referred to hereinbefore the regulating blades could thus be moved into their inoperative mid position and remain for the time being in said position owing to the action of said second controlling member when the ship assumes for a longer period a true or approximate horizontal position and in which position the first controlling member does consequently not exert any influence on the servomotor that has to effect the adjustment of the regulating blades.

Devices for carrying the method according to the invention into effect are described hereinafter with reference to the accompanying drawings.

Such a device, the servomotor of which is actuated by fluid under pressure may be designed so that the controlling member, for instance a controlling piston or a controlling valve, is urged towards its mid position by the action of springs or weights.

Further, the device may show the feature that the controlling member of the servomotor is displaced out of its mid position by means of a dash-pot arrangement.

A device that has to reduce the rolling movement of ships according to the present method may be fitted with an inertia pendulum acting as auxiliary organ, the momentary position of which is dependent on the service conditions to be regulated. Such a pendulum in the form of a weight loaded pendulum retains its absolute position during the movement of the ship as accurately as possible and alters its relative position with regard to the ship in the same degree as the latter alters its absolute position.

In such a device the servomotor may actuate at least one regulating blade counteracting the oscillating movements of the ship.

In a device working according to the above described method and utilized for speed regulation of a power generating machine for instance of a water turbine, the auxiliary organ, the momentary position of which is dependent upon the working conditions to be regulated may consist of a centrifugal governor driven by the power generating machine for instance by the water turbine.

Fig. 3 illustrates by way of example an arrangement for damping the rolling movement of a ship by means of a servomotor worked by pressure oil, an inertia pendulum being utilized as auxiliary organ. The pendulum 11 is pivotally mounted on a knife edge 12. To the lower arm of the pendulum a lever 14 is connected by a link 13, the lever 14 being adapted to swing around a fixed fulcrum 15. The lower end 16 of said lever transmits the swinging motions of the pendulum 11 in a magnified manner to the needle 17. The latter acts as a regulating needle to a small auxiliary servomotor H provided with a differential piston 20, from which the power necessary for displacing the controlling member 30 is derived. The pendulum 11 or the lever 14 respectively might be adapted to displace the controlling member 30 directly, i. e. without the intermediary of the small auxiliary servomotor H. Such an arrangement would be much simpler but the arrangement illustrated in Fig. 3 is more advantageous inasmuch as the power to be exerted by the pendulum is small, the sensitiveness and the accuracy of the whole arrangement being consequently increased. To the small auxiliary servomotor, which is regulated by the needle 17, pressure liquid is supplied by means of the conduit 18 which liquid maintains continuously a pressure in the space 19 on the right hand side of the differential piston 20. From the space 19 a small quantity of pressure liquid is constantly flowing through the small bore 21 into the space 22 at the left hand side of the differential piston 20. From this space the pressure liquid escapes by the channel 23, the cross-sectional area of which is larger than that of the bore 21. With the end of the channel 23 the regulating needle 17 co-operates and influences the free discharge opening of this channel. The differential piston 20 is connected by the rod 24 to the piston 25 of the dash pot. The piston 25 is adapted to move in the dash pot casing 26 which is filled with oil. The spaces to the right and to the left hand side of the piston 25 are connected with each other by a conduit 27 provided with a cock 28, which regulates the area of flow. The piston 25 is provided with two non-return valves which admit of a quick displacement of said piston by the piston 20 of the auxiliary servomotor whereby one or the other of these valves opens, whilst the valves remain closed when a comparatively small force tending to displace the piston 25 or the casing 26 acts upon these parts, in which case the oil can only flow through the throttled opening of the cock 28. The casing 26 of the dash-pot is rigidly connected by the rod 29 with the controlling piston or valve 30 movable in the casing 31. To the latter pressure liquid is supplied by means of the conduit 32, the two conduits 33 and 34 serving for the discharge of the presssure liquid from the controlling member 30, 31. The two annular spaces 35 and 36 of the casing 31 are connected by the conduits 37 and 38 respectively to the two chambers 39 and 40 respectively of the cylinder 41. Inside this cylinder a piston 42 is provided which actuates by means of the piston rod 43, the connecting link 44 and the lever 45 the regulating shaft 46, by which shaft the main regulating member for regulating the working conditions of the contrivance is actuated. In the present example the lever 45 actuates at least one regulating blade which tends to counteract the rolling movement of the ship.

A constructional example of a ship fitted with the above described regulating arrangement is diagrammatically shown in Figs. 8–11; Fig. 8 representing a side view, Fig. 9 a plan view, Fig. 10 a section along line A—B of Fig. 8 and Fig. 11 a section along line C—D of Fig. 8, both sections being seen from the right hand side. Let it be assumed that the ship is travelling in the direction of the arrow I and carries out at the same time a rolling movement in the direction of the arrow II. As is shown in Figs. 8–11, two rods 90 and 91 are linked to the lower end of the lever 45, by which rods the axles 92 and 93 are turned. The latter project through the hull of the ship and are fitted at their outer ends with the regulating blades 70 and 71. In the position shown in Fig. 8 the piston 42 of the servomotor is seen displaced by a small amount out of its mid position towards the right hand side. In consequence thereof the two regulating blades 70 and 71 are turned out of their horizontal positions in the required direction. The reacting pressure of the water on the left hand blade 71 causes a lifting of the left hand side of the ship (arrow III) whereas the reacting pressure on the right hand blade 70 causes a lowering of the right hand side of the ship (arrow IV). These actions counteract the above mentioned rolling movement (arrow II).

Besides the above described first or main controlling device for the servomotor a second controlling device is also shown in Fig. 3, the task of which second controlling device is to cause the piston 42 of the motor to assume the required definite position during the state of inertia of the contrivance. This position is as a rule, i. e. when the ship occupies a horizontal position, the mid position within cylinder 41. The second controlling device is also operated by the pendulum 11. To this end the upper end 48 of the lever 49 is linked by the connecting link 47 to the lower arm of the pendulum; the lower end 50 of the lever 49 is pivotally connected to the left hand end of the piston rod 43 of the motor, which rod projects through the cylinder casing at both ends of the latter. At the point 51 of the lever 49 a connecting link 52 is linked which is operatively connected to the controlling piston valve 53 of the second controlling arrangement. Said valve reciprocates within the casing 54 to the centre space 55 of which pressure fluid is supplied through the conduit 56. The discharge of the used pressure fluid occurs at the two ends of the casing 54 through the conduits 57 and 58. The two annular spaces 59 and 60 are connected by means of the conduits 61 and 62 to the two sides 39 and 40 of the piston 42 of the servomotor.

The operation of the above described arrangement will now be explained, it being again assumed that the arrangement is utilized for preventing the rolling movement of a ship. In this special case curve II shown in Fig. 1 corresponds to the comparatively small inclinations of the longitudinal centre plane of the ship resulting when use of the above described governing arrangement is made. At the same time curve II gives a measure of the changes in the relative positions of the auxiliary organ initiating the adustment of the main regulating members and which positions correspond to said inclinations. In the present case curve II gives a measure of the inclinations of the pendulum 11 against the centre plane of the ship.

In the state of inertia of the ship, i. e. when the latter remains for a certain time in the horizontal position, the pendulum 11 remains in its vertical position and is parallel to the centre plane of the ship, and the parts of the whole governing arrangement occupy the mid position illustrated in Fig. 3. When the ship starts to roll, an inclination of the pendulum 11 relatively to the ship is brought about and therefore relatively to the servomotor as the latter is taking part in the rolling movement of the ship. This deviation starts at the time $t_1$ (Figs. 1 and 2) and has reached its maximum value at the time $t_8$, when the ship starts to oscillate back towards its mid position. During the interval from $t_1$ to $t_8$ the pendulum 11 (Fig. 3) has changed its position relatively to the centre plane of the ship with a varying speed, which has a minimum value at the beginning and at the end of the rolling and a maximum in the middle of this movement. The change of speed during said period is represented by the part 1'—2'—2a'—7'—8' of the curve III of Fig. 2.

The various positions of the pendulum 11 with regard to the centre plane of the ship and the adjustment of the governing arrangement and of the piston 42 of the servomotor resulting from the various positions of the pendulum are shown in Figs. 4–6 in which for the sake of clearness the small auxiliary servomotor H is not shown. Fig. 4 shows in a diagrammatic manner the positions of the various parts of the governing arrangement at the time $t_8$, at which time the first oscillation of the ship has reached its maximum amount. In consequence of the relative displacement of the lower end of the pendulum 11 towards the left, the piston of the dash pot K is also displaced towards the left by the action of the small auxiliary servomotor H which follows immediately any movement of the pendulum. Upon a movement of the needle 17 (Fig. 3) towards the left the discharge opening of the channel 23 is free, the pressure in the space 22 thereby falls and the pressure prevailing permanently in the space 19 forces the piston 20 towards the left, whereby it moves along with it the rigidly coupled dash pot piston 25. In consequence of this movement the piston 25 exerts a pressure on the dash pot cylinder or casing 26 as it presses on the oil on the left hand side of said piston. This pressure tends to displace the cylinder towards the left, but as long as said pressure is smaller than the tension of the spring 63, which in its turn tends to hold the controlling valve 30 rigidly connected to the cylinder 26 of the dash pot in its mid position, the dash pot cylinder 26 does not alter its position and the piston 25 of the dash pot K is moved alone towards the left. By this movement of the piston 25 the oil is forced through the throttling opening in the cock 28 from the left to the right hand side of the dash pot piston. However, as soon as the pressure on the left of the dash pot piston 25 is greater than the tension of the spring 63, which occurs automatically when the speed of displacement of the piston 20 exceeds a certain limit, the casing 26 is drawn towards the left as well and the controlling valve 30 is displaced towards the left until it rests against the shoulder 64, whereby the spring 63 is compressed. If the movement of the pendulum 11, i. e. its relative turning in a clockwise direction continues, the piston of the dash pot may continue its travel towards the left within the casing 26 as the non-return valve provided in the upper part of the piston, which is open at this time, admits of this further travel. It is thereby assumed that the tension of the springs $25^a$ and $25^b$ of the non-return valves is adjusted so relatively to the tension of the springs 63 and $63^a$ that the latter yield before the non-return valves in the dash pot piston 25 start to play and the non-return valves only become active after the controlling valve 30 has completed its whole stroke, so that no further movement of the dash pot cylinder 26 is possible. Instead of the springs 63 and $63^a$ a weight loaded lever may be used as indicated in dotted lines in Fig. 3. The speed at which the casing 26 of the dash pot is moved by the piston 25 can be regulated by adjusting the throttling passage of the cock 28. The throttling action may for instance be so regulated that during the period represented in the diagram by the distance corresponding to the time $t_2$ to $t_7$ (Figs. 1 and 2), the controlling valve 30 remains displaced towards the left, i. e. said valve will be displaced at the time $t_2$ and will be returned to its mid position by the action of the spring 63 at the time $t_7$. At the beginning of the space of time $t_2$ to $t_7$ the piston 42 of the servomotor moves from left to right, as the space 39 has been connected to the pressure conduit 32 and the space 40 to the discharge conduit 33. The lever 45 and the regulating shaft 46 have thus been turned in an anticlockwise direction and the regulating blades 70 and 71 (Figs. 8–11) have been moved so that they counteract the rolling of the ship. At a certain moment, which depends on the speed of the piston 42, the position of the parts of the controlling arrangement diagrammatically shown in Fig. 4 will be brought about, the piston 42 being at the extreme right of the cylinder and remaining in that position until the automatically starting return-movement of the ship has attained the required high velocity necessary for the displacement of controlling valve 30 in the opposite direction, which is the case at the time $t_9$ (Figs. 1 and 2). This displacement occurs when the piston 25 of the dash pot is in the position shown in Fig. 4, it being then at the left end of the casing 26. In this manner every fresh oscillating movement of the ship would cause the controlling valve 30, as soon as a certain velocity of the oscillating movement has been attained, to be displaced towards the required side, no matter which momentary relative position the pendulum 11 occupies, so that at any desired and selected moment after the start of the oscillating movement the servomotor and by it the regulating blades are actuated in the necessary manner. Thereby the rolling movement of the ship, which, but for the action of the controlling arrangement, might take place in accordance with the dotted curve I (Fig. 1) is damped, so that the oscillating movement may for instance take place in the manner indicated by the full line curve II in which at the time $t_{13}$ a state of inertia is again attained.

When this state of inertia is attained, the main regulating member of the ship (the pair of blades 70, 71 shown in Figs. 8–11) has to be moved back into its inoperative (horizontal) position and has to remain in that position. This is attained by the second controlling device, which, in consequence of its essentially smaller dimensions becomes only operative when the larger controlling member 30 of the first controlling device is in its mid position.

The various events occuring during one oscillation shall now be considered, it being assumed that the second controlling device is also operative. At the time $t_8$ (Figs. 1 and 2) the piston 42 of the motor is in the position shown in Fig. 4, as has been explained before. The controlling valve 30 of the first controlling device has resumed its mid position at the time $t_7$. The movement of the piston 42 towards the right has been assisted from the beginning of the rolling movement of the ship by the second controlling device. The piston 53 within the casing 54 of the second controlling device has been displaced towards the left upon the deviation of the pendulum 11, the lever 49 turning thereby at first about its fulcrum 50. In this displaced position of the piston 53 pressure liquid is admitted to the left hand side 39 of the servomotor from the conduit 56 through the channel 61; at the same time the right hand side 40 of the servomotor is connected to the discharge conduit 58 by the channel 62. This second controlling device acts therefore in the same way as the first controlling device. Supposing now the position of the ship at the time $t_8$ (Figs. 1 and 2) to be a state of inertia, the ship being in an inclined position and the regulating blades being in a corresponding position, then the second controlling device maintains this state although the first or main controlling device is inoperative as it is in its mid position. Upon the movement of the piston 42 towards the right the piston valve 53 has been displaced towards the right, i. e. in a direction that is opposite to its first direction of displacement. By means of the lever 49 a certain dependency of the position of the piston 42 upon that of the pendulum 11 is always ensured, so that in each position of repose of the ship, in which case the controlling valve 30 has to be in its inoperative position, the piston 42 and thereby the regulating blades 70 and 71 are kept in the position corresponding to that position of the ship; in the horizontal position of the ship they are for instance kept in the mid position, that is to say also in the horizontal inoperative position. By the aid of the second controlling device the displacement of the piston 42 and of the regulating blades in the manner shown in Fig. 4 would be maintained and said parts would only go slowly backwards until the ship passes on its oscillating movement at the time $t_{10}$ through the horizontal position. Only at this moment the piston would be moved out of its mid position towards the left and thereby a displacement of the regulating blades counteracting the new direction of oscillation of the ship would start. However, at the time $t_9$ at which the velocity of the new oscillating moment has reached the necessary amount, the first controlling device becomes already operative and displaces the piston 42 quickly towards the left hand side. Fig. 5 illustrates in a diagrammatic manner the position of the parts of the controlling arrangement at the time $t_{10}$. As the ship keeps on oscillating with great velocity, the pendulum 11 is performing an oscillating movement in an anticlockwise direction as indicated by the arrow. The controlling piston 30 is therefore in its extreme position at the right hand side and the piston 42 has been displaced by the action of the first controlling device to the extreme left whereby the shaft 46 has been turned in a clockwise direction so that the regulating blades are exerting their full action. At the time $t_{11}$, at which the position of the parts of the governing arrangement is diagrammatically shown in Fig. 6, the controlling valve 30 returns to its mid position as the oscillating movement of the pendulum in the anticlockwise direction is nearly stopped, so that only the upper controlling device is operative. During the whole period $t_9$ to $t_{11}$ this second controlling device has not exerted any appreciable action on account of its comparatively small dimensions. The piston valve 53 of this device remains of course during this period in its displaced position as only at the time $t_{11}$ a state is reached which might correspond to a possible state of inertia in which the ship is in an inclined position and the regulating blades 70, 71 assume corresponding positions.

As long as the piston valve 30 is in its mid position, the piston 42 is solely under the influence of the piston valve 53 and will continue in its movement until it has returned the piston valve 53 to its mid position by means of the lever 49 linked to the piston rod 43, when a state of inertia is reached (the known governing effect with positive returning arrangement). During a lasting horizontal position of the ship as is the case at the times $t_1$ and $t_{13}$ (Figs. 1 and 2) the parts of the whole governing arrangement are in the mid position shown in Fig. 3.

When the method according to the invention is carried into effect in connection with a governing arrangement for a power generating machine, a centrifugal governor driven by the machine may be used instead of the pendulum 11. Such an arrangement is shown by way of example in Fig. 7, in which the centrifugal governor 111, the axle 112 of which is rotated by the machine, actuates the regulating needle 117, which corresponds to the regulating needle 17 shown in Fig. 3, by the interposition of sleeve 113, rod 114, lever 115, connecting rod 116 and lever 118.

The lever 115 actuates also the lever 149 through intermediary of the connecting rod 147; at the point 151 of said lever 149 the piston valve of the second controlling device is linked by means of the rod 152. The main regulating shaft 146, actuated by the piston 142 of the servomotor through intermediary of lever 145, is adjusting in this case the member controlling the admission of the motive fluid of the power machine (for instance of a steam engine or water turbine).

We claim:

1. A governing device for a servomotor adapted to regulate working conditions of a contrivance, comprising an auxiliary organ the position of which is dependent on the working conditions to be regulated, a controlling member for the servomotor, means operatively connecting said controlling member to said auxiliary organ and adapted to effect a displacement of said controlling member out of its mid position as soon as the velocity with which the auxiliary organ is moved in one or the other direction exceeds a certain limit and being further adapted to keep said controlling member out of its mid position as long as said velocity is exceeded, and means adapted to return said controlling member to its mid position when said velocity limit is no longer exceeded.

2. A governing device for a servomotor adapted to regulate working conditions of a contrivance, comprising an auxiliary organ the position of which is dependent on the working conditions to be regulated, a controlling member for the servomotor, means operatively connecting said controlling member to said auxiliary organ and adapted to effect a displacement of said controlling member out of its mid position as soon as the velocity with which the auxiliary organ is moved in one or the other direction exceeds a certain limit and being further adapted to keep said controlling member out of its mid position as long as said velocity is exceeded, a piston movable within said servomotor, a second controlling member for the servomotor operatively connected to said auxiliary organ and adapted to effect a determinate adjustment of said piston of the servomotor for every position of rest of said auxiliary organ, and means adapted to return the first mentioned controlling member to its mid position when said velocity limit is no longer exceeded.

3. A governing device for a servomotor adapted to regulate working conditions of a contrivance, comprising an auxiliary organ the position of which is dependent on the working conditions to be regulated, a controlling member for the servomotor, means operatively connecting said controlling member to said auxiliary organ and adapted to effect a displacement of said controlling member out of its mid position as soon as the velocity with which the auxiliary organ is moved in one or the other direction exceeds a certain limit and being further adapted to keep said controlling member out of its mid position as long as said velocity is exceeded, and springs operatively connected to said controlling member and adapted to return said controlling member to its mid position when said velocity limit is no longer exceeded.

4. A governing device for a servomotor adapted to regulate working conditions of a contrivance, comprising an auxiliary organ the position of which is dependent on the working conditions to be regulated, a controlling member for the servomotor, means including a dash pot arrangement operatively connecting said controlling member to said auxiliary organ and adapted to effect a displacement of said controlling member out of its mid position as soon as the velocity with which the auxiliary organ is moved in one or the other direction exceeds a certain limit and being further adapted to keep said controlling member out of its mid position as long as said velocity is exceeded, and means adapted to return said controlling member to its mid position when said velocity limit is no longer exceeded.

5. A governing device for a servomotor adapted to regulate working conditions of a contrivance, comprising a pendulum the position of which is dependent on the working conditions to be regulated, a controlling member for the servomotor, means operatively connecting said controlling member to said pendulum and adapted to effect a displacement of said controlling member out of its mid position as soon as the velocity with which the pendulum moves in one or the other direction exceeds a certain limit and being further adapted to keep said controlling member out of its mid position as long as said velocity is exceeded, and means adapted to return said controlling member to its mid position when said velocity limit is no longer exceeded.

6. A governing device for a servomotor adapted to regulate or damp the rolling movements of a ship, comprising a pendulum the position of which is dependent on the positions of the ship during its rolling movement, a controlling member for the servomotor, means operatively connecting said controlling member to said pendulum and adapted to effect a displacement of said controlling member out of its mid position as soon as the velocity with which the pendulum moves in one or the other direction exceeds a certain limit and being further adapted to keep said controlling member out of its mid position as long as said velocity is exceeded, blades adapted to counteract the rolling movement of the ship and operated by said servomotor, and means adapted to return said controlling member to its mid position when said velocity limit is no longer exceeded.

In testimony that we claim the foregoing as our invention, we have signed our names.

HEINRICH ZOELLY.
ANTON GAGG.